(No Model.) 9 Sheets—Sheet 1.
C. H. COOLEY.
AUTOMATIC GRAIN SCALES.

No. 403,988. Patented May 28, 1889.

Fig. 1.

Witnesses:
Geo. W. Drake
L. R. Heermann

Inventor:
Charles H. Cooley,
By his Attorney, F. H. Richards.

(No Model.)

C. H. COOLEY.
AUTOMATIC GRAIN SCALES.

No. 403,988.

Patented May 28, 1889.

Witnesses:
Geo. W. Drake
L. L. Heermann.

Inventor:
Charles H. Cooley,
By his Attorney,
F. H. Richards (No Model.) 9 Sheets—Sheet 7.

C. H. COOLEY.
AUTOMATIC GRAIN SCALES.

No. 403,988. Patented May 28, 1889.

Witnesses
Geo. W. Drake
L. C. Heermann

Inventor:
Charles H. Cooley
By his Attorney,
F. H. Richards.

(No Model.)
9 Sheets—Sheet 8.

C. H. COOLEY.
AUTOMATIC GRAIN SCALES.

No. 403,988. Patented May 28, 1889.

Witnesses:
Geo. W. Drake
L. L. Heermann.

Inventor:
Charles H. Cooley,
By his Attorney,
F. H. Richards.

(No Model.) 9 Sheets—Sheet 9.
C. H. COOLEY.
AUTOMATIC GRAIN SCALES.

No. 403,988. Patented May 28, 1889.

Witnesses:
Geo. W. Drake
L. L. Heermann.

By his Attorney,
F. H. Richards

Inventor:
Charles H. Cooley.

UNITED STATES PATENT OFFICE.

CHARLES H. COOLEY, OF HARTFORD, CONNECTICUT, ASSIGNOR TO THE PRATT & WHITNEY COMPANY, OF SAME PLACE.

AUTOMATIC GRAIN-SCALES.

SPECIFICATION forming part of Letters Patent No. 403,988, dated May 28, 1889.

Application filed February 3, 1888. Serial No. 262,850. (No model.)

*To all whom it may concern:*

Be it known that I, CHARLES H. COOLEY, a citizen of the United States, residing at Hartford, in the county of Hartford and State of Connecticut, have invented certain new and useful Improvements in Automatic Grain-Scales, of which the following is a specification.

This invention is in the nature of an improvement on the "grain-meter" patented to J. W. Hill, July 15, 1884, No. 302,136.

In the drawings accompanying and forming a part of this specification.

Similar characters designate like parts in all the figures.

The form of frame-work which I have shown for supporting the several operative details of my improved grain-weighing machine is substantially the same as shown in the aforesaid patent to J. W. Hill. Said frame-work (shown standing on floor F) consists of two suitable side frames, 2 and 4, and suitable cross-beams or rods holding said frames together. One such beam (designated by 3) joins the rear sides of the plates or frames 2 and 4 and supports at proper times the weights suspended from the scale-beam. Another beam, 5, joins the upper part of the frames and may serve to carry certain details, hereinafter described. Other crosswise tie-rods are sometimes provided in the larger sizes of the machines.

My improved machine comprises as principal elements thereof a scale-beam, a double-chambered oscillating bucket suspended from one end of said beam, a counterpoise or weight supported from or on the opposite end of said beam, a supplemental weight, a discharging-hopper above said bucket, a movable receiving-hopper below said bucket, a pair of cut-off valves and devices actuating the same from the scale-beam, and a regulator-valve operatively connected with the movable receiving-hopper. Not all of these elements, however, are necessarily employed in a single machine.

The scale-beam B is a frame composed of ribs or bars, and is preferably cast in a single piece. On its under side the beam B has V-shaped bearings 8, which rest on the usual knife-edges, 9, affixed to the side frames. Side stops, 10, are or may be provided to resist lateral movement of the scale-beam on its supporting-knife edges. At its rear end the scale-beam has thereon a knife-edge, 11, from and on which the weight-rod 12 is suspended by a hook, 13, having therein the usual V-shaped bearing. The lower end of rod 12 passes freely through a hole, 14, Fig. 6, in beam 3. A buffer, 15, is ordinarily affixed to the lower end of rod 12 to limit the upward movement of said rod and lessen the shock due to the stoppage of the descending loaded bucket. The large weight 16, suitably fixed on rod 12, is designed to approximately balance the empty bucket, while one or more small weights, 17, are provided to furnish the force required to work the cut-off valves. The weights 18 correspond to the weight of grain to be weighed at a single charge.

At its forward end the scale-beam consists of two arms, 20 22, provided, respectively, with the knife-edges 19 and 21, from and on which edges the grain-bucket is suspended. The arms 20 22 have respectively at their extreme front ends weighted pawls 23 24, pivoted to said arms at 25 26 and normally lying against stops 27 28; also valve-stops 29 30, whose particular purpose and operation will be hereinafter explained. Approximately in lateral alignment with the beam-supporting edges 9 the beam B has or may have suitably supported thereon a poising-weight, as 31, which corresponds to the "weight F²," shown in the aforesaid patent to Hill. It should be understood that this weight is comprised in that class of details which, though convenient, are not necessary.

The main scale-beam B also carries a second or supplemental beam or lever, 32, which is pivoted at about the point 33 to said main beam, and which carries a supplemental weight, 34, that is made adjustable on its said beam 32. A stop-screw, 35, in one of the beams, and bearing against the other beam, serves to adjust their relative positions as may be required. The forward end, 36, of said beam 32 is arranged to bear (at certain times) against a stop, 37, which is properly located therefor, and may be supported in any convenient manner.

Figure 3:
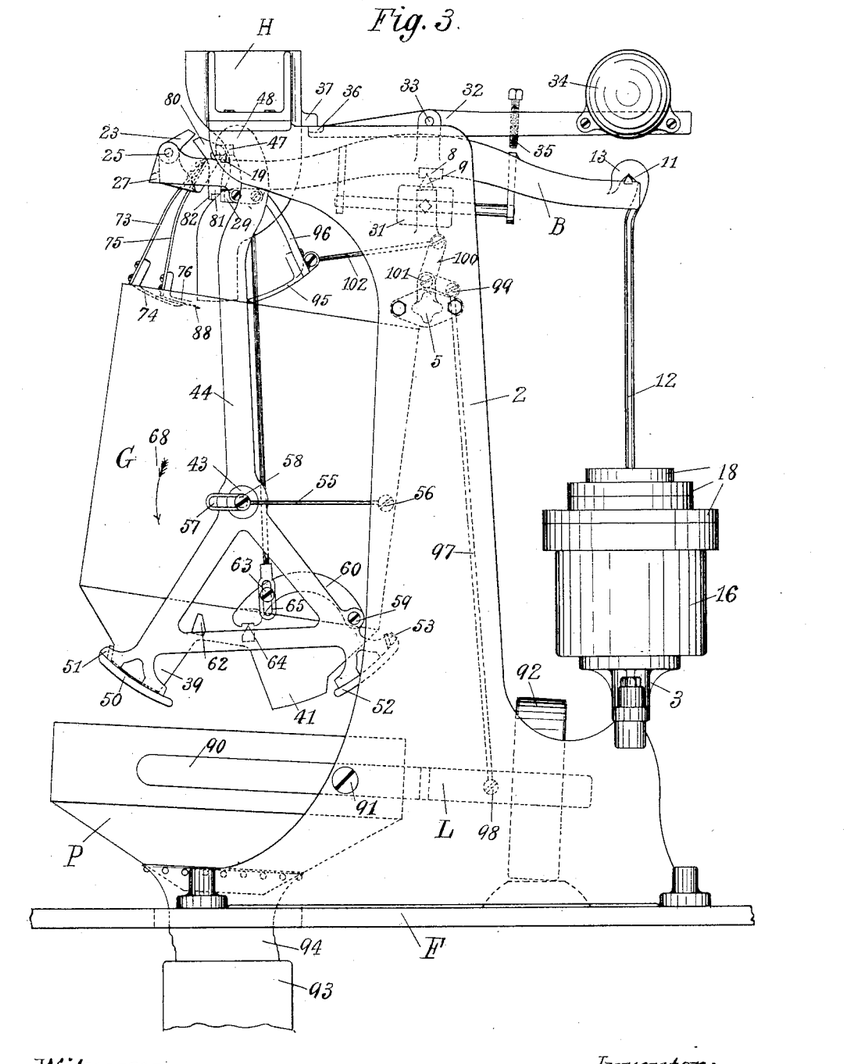
Fig. 3 is an elevation of the right-hand side of the machine, showing the side which is at the right hand in Fig. 2.
Figure 4:
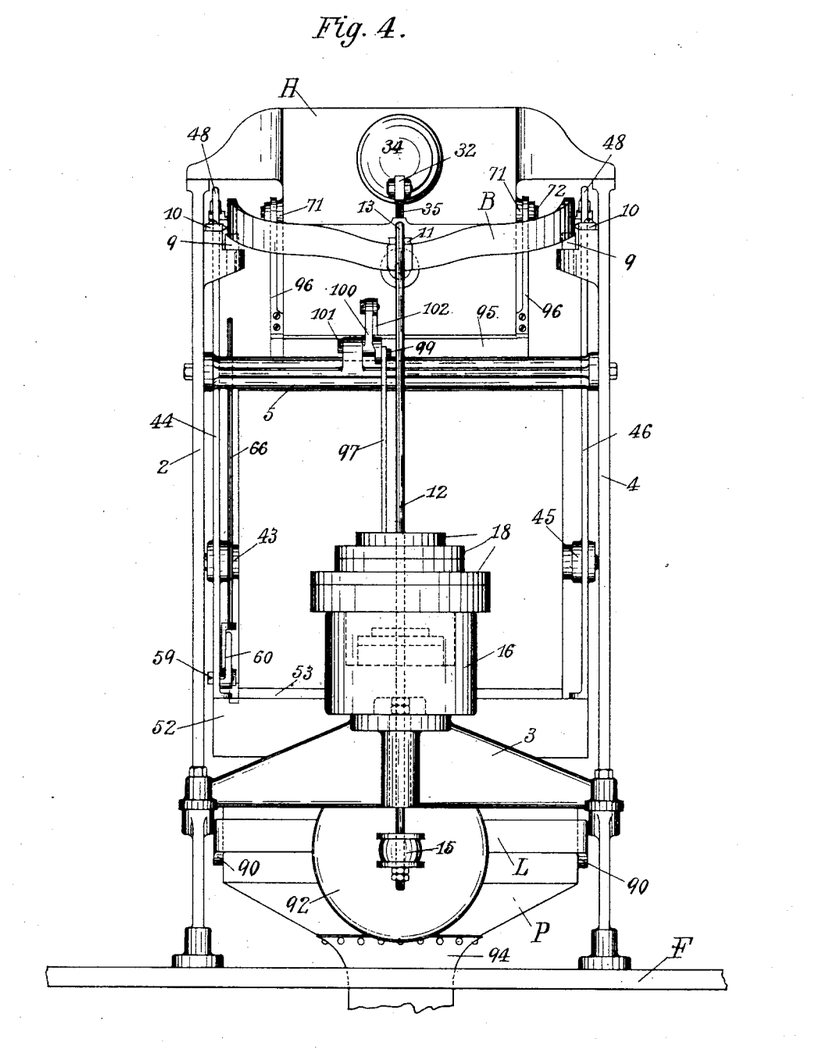
Fig. 4 is a rear elevation of the machine.
Figure 5:
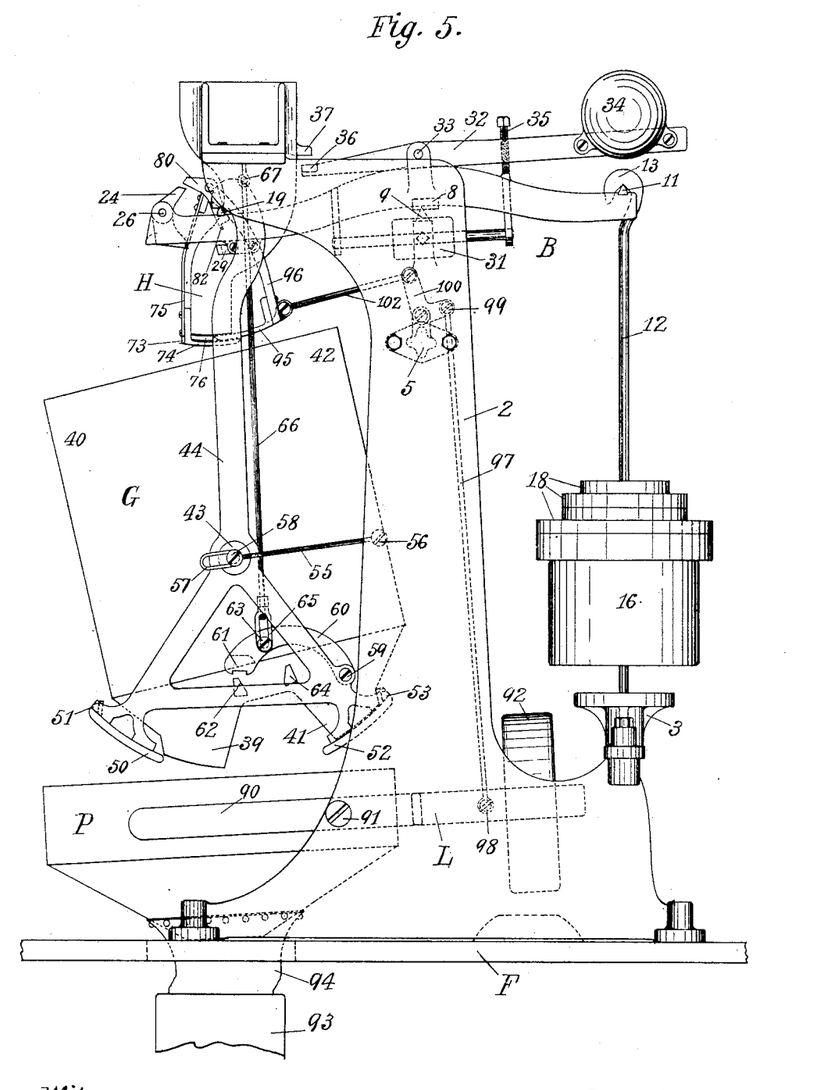
Fig. 5 is an elevation similar to Fig. 3, showing the mechanism in a different position.
Figure 6:
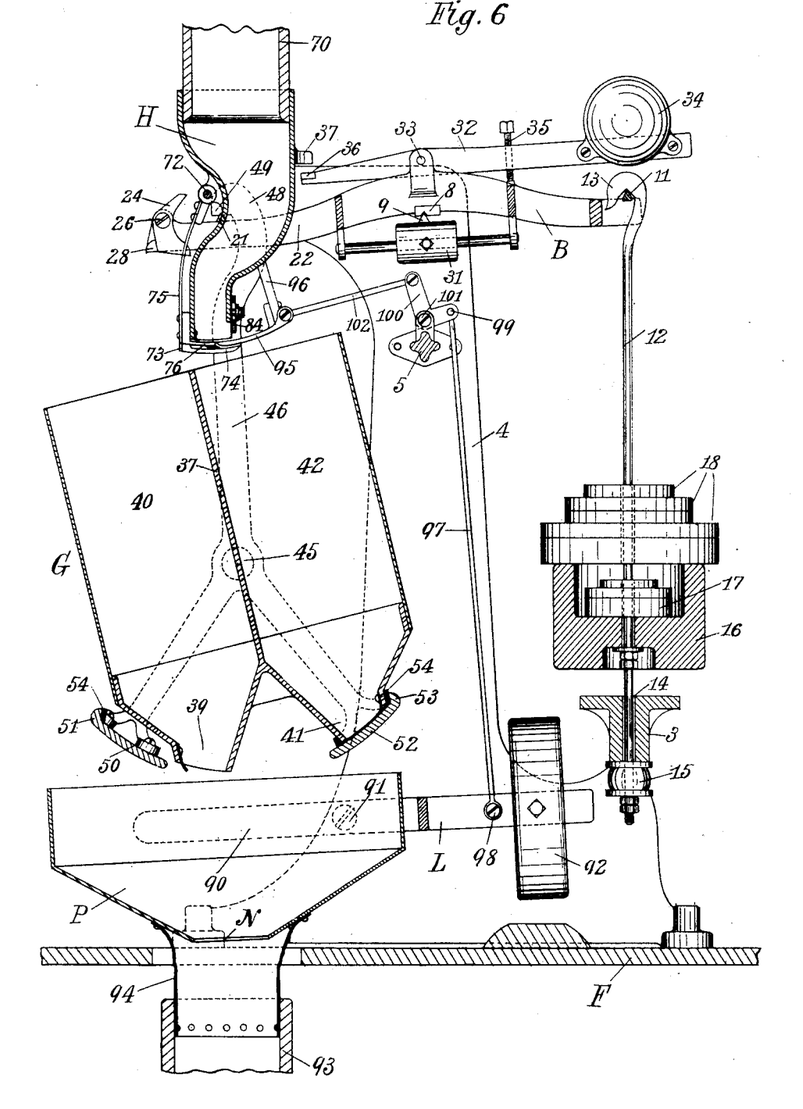
Fig. 6 is a central vertical section in a plane from front to rear through the machine, showing the parts in the same position as in the next previous figure.

The usual extent of the movement of the main scale-beam is shown by Figs. 3 and 6. In Fig. 3 the position of the main beam is such that lever 32 bears against stop 37, thereby lifting stop 35 from its seat on beam B. The weight 34 is now supported on a point substantially over edges 9, so that said weight does not materially affect the movement of the main beam; but in Fig. 6 (also in Fig. 5) the movement of beam B, acting through stop 35, has carried up weight 34, which weight then becomes in effect added to the weights suspended from knife-edge 11.

The grain-bucket (designated in a general way by G) has two similar oppositely-disposed chambers, 40 42, divided by the partition or wall 37. At their lower ends said chambers are contracted in cross-sectional area, and terminate in spouts 39 and 41, respectively, whose lower edges are concentric to the axis of the pivots or journals on which the bucket is supported and oscillates. These journals, which are designated by 43 and 45, respectively, and are rigidly fixed on the bucket, have their bearings in the hangers 44 46, that are suspended by means of inverted-V-shaped bearings 47 49 from the aforesaid knife-edges 19 and 21. Said bearings 47 and 49, I form on the under side of the hook-shaped upper ends, 48, of said hangers, so that the bucket may be readily removed from the machine together with the said hangers attached thereto. Below the journals or trunnions 43 45 the hangers are shaped to carry the valves or bottoms 50 52 for the respective bucket-chambers 40 42 in their proper positions relative to each other and to the spouts 39 and 41. On its outer edge each bucket-valve has or may have a ledge or abutment, 51 53, respectively, which serve as stops for properly limiting the oscillating movement of the bucket on its trunnions. In practice I face each of said abutments with a rubber or other yielding strip, 54, to lessen the noise and shock otherwise resulting from the blows of the bucket on said ledges or abutments.

The above-described construction and arrangement of the hangers, bucket, and bucket valves and stops is not merely a matter of convenience in construction, but has a well-defined utility in this class of grain-weighing machines. Heretofore it has been customary to place the bucket-stopping abutments near the top of the bucket, above and not below the bucket-bearings. The force of the swinging bucket striking against said abutments was thus delivered to the hangers at a point about midway between the bucket-journals and the knife-edges 19 and 21. This action, aided by the considerable inertia of the bucket, resulted in a powerful sidewise thrust on said knife-edges, often sufficient to unseat the bearings thereon and very inimical to the continued accurate operation of the machine. By means of my present improvements I have practically overcome that disadvantageous feature. By placing the abutment on the bucket-valve I locate it more nearly in line (concentrically with the bucket-axis) with the normal center of percussion, and by placing said abutments at the lower end of the hangers the elasticity of the whole length of said hangers is, practically considered, made effective in easing the aforesaid thrust on the bucket-supporting knife-edges. For these reasons I can make the said edges more delicate and accurate in operation (while preserving abundant strength) than was formerly practicable.

Figure 1:
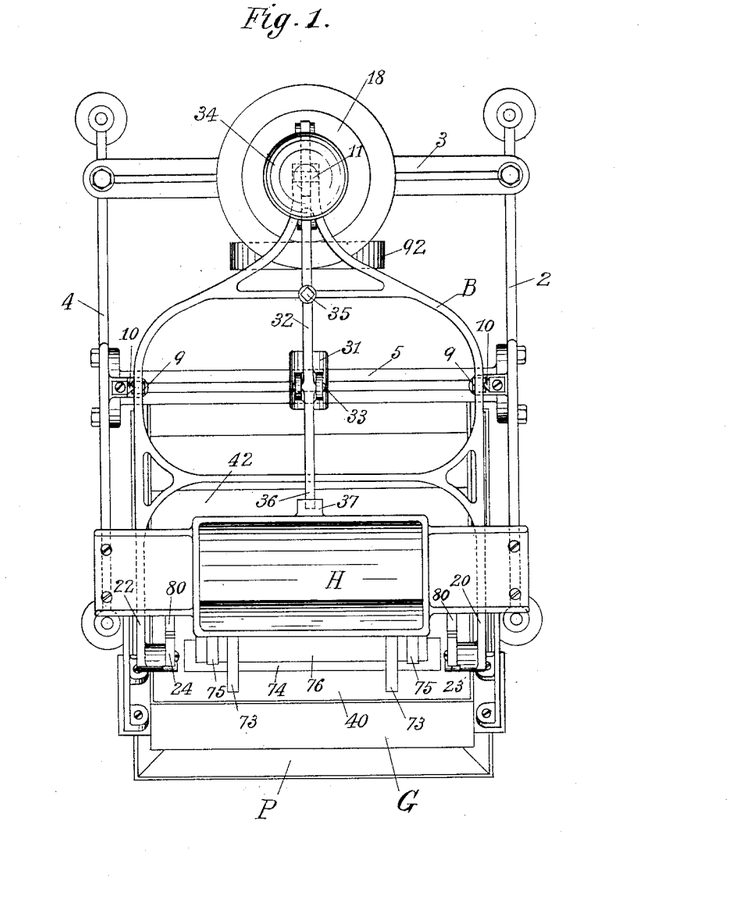
Figure 1 is a plan of an automatic grain-scale embodying my improvements.
Figure 2:
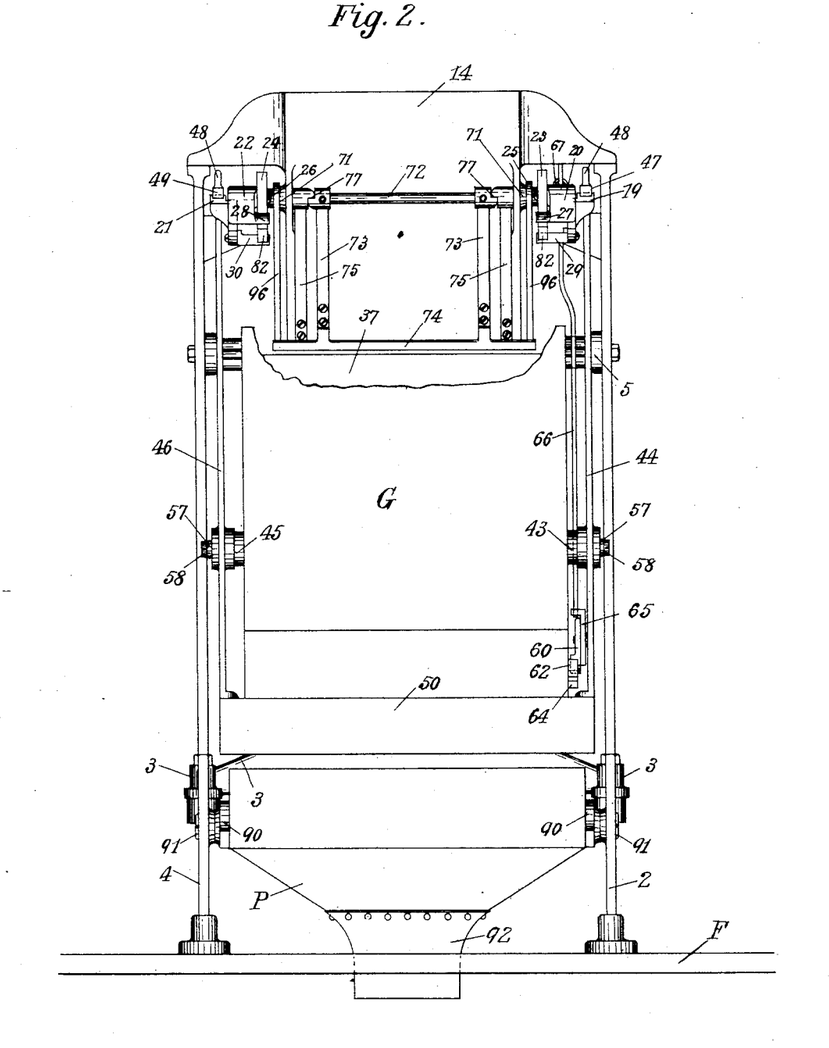
Fig. 2 is a front elevation of the machine.

For preventing the excessive swaying of the hangers and buckets, I have sometimes used a simple link, 55, Figs. 2, 3, and 5, loosely connected at one end to the machine-frame at 56 and having at the other end a loop, 57, inclosing a shoulder screw or stud, 58, fixed in the bucket-journal, two links being usually provided—one on each side of the machine.

Figure 12:
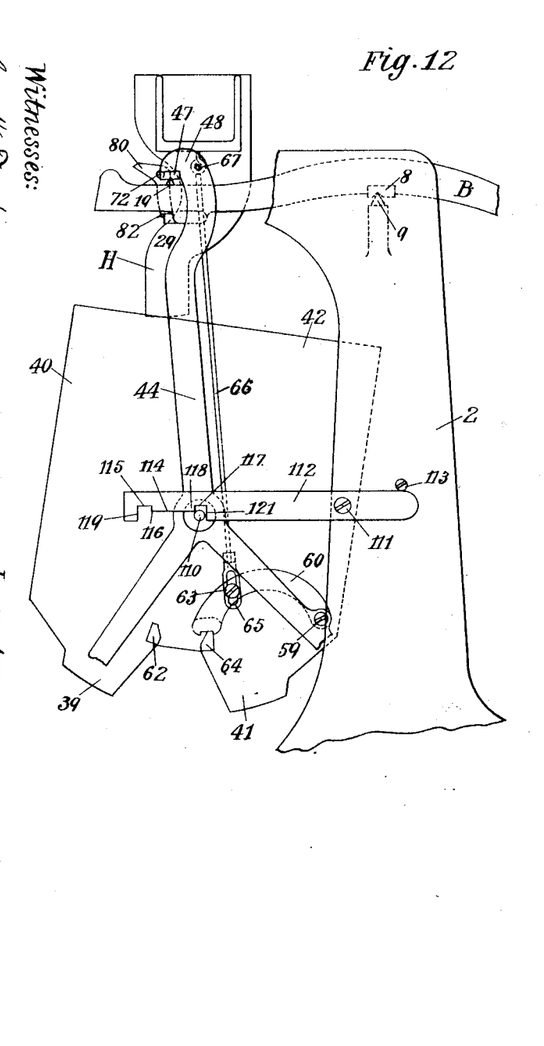
Figure 13:
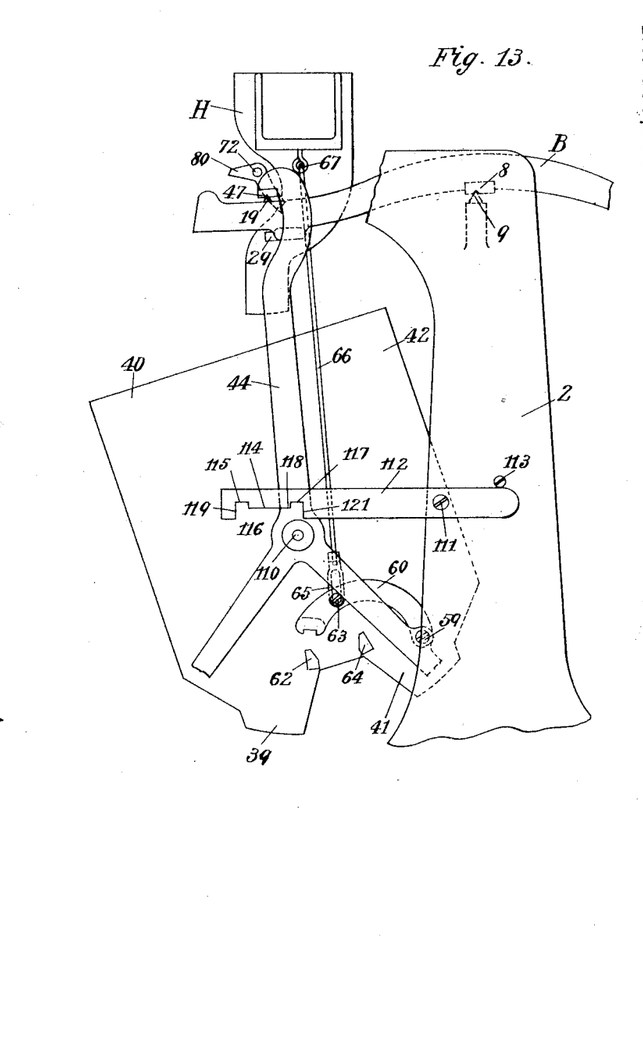
Figure 14:
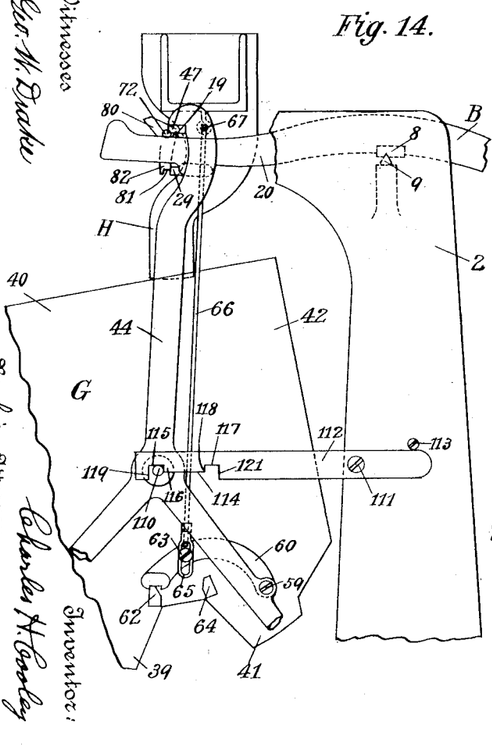

The oscillation of the bucket on its journals is effected by the weight of the grain therein contained, and said movement is restrained or delayed until the proper moment by means of a latch arranged to engage with suitable catches on said bucket. The bucket-latch 60 is pivoted to the hanger at about the point 59, and has a notch, 61, for engaging with the bucket-catches 62 64, fixed on the bucket. A stud, 63, is fixed in the latch and works in the loops 65 of the tripping-rod 66, the upper end of which rod is connected to the frame in any convenient manner at some point, as 67, (see Figs. 2 and 5,) substantially over stud 63. The bucket is shown tipped backward in Fig. 3 and forward in Fig. 5, in which cases the latch engages with catches 64 and 62, respectively. The bucket, standing as in Fig. 3, receives its load in chamber 40, and thereby acquires a tendency to turn in the direction of arrow 68, which tendency is for the time being resisted by catch 64; but when the increasing load carries down the bucket, as in Fig. 5, the rod 66 raises latch 60, and thus releases the bucket, which is then carried over to its position in this figure. The load being now discharged, the bucket rises and brings catch 62 into engagement with latch 60, thereby locking the bucket in position for the loading of chamber 42. These successive latch positions are shown in Figs. 12, 13, and 14, respectively. Thus the latch operates on said catches alternately so long as the machine is in use.

Immediately above the grain-bucket the discharging hopper or spout H is held in place by some suitable connection with the main frame, and grain is supplied to said hopper by some suitable trough or chute, as 70, Fig. 6. A valve-shaft, 72, is mounted in bearings 71 71 on the hopper H, and carries fixed thereon the arms 73 of the supplemental cut-off valve 74. Loosely mounted on said valve-shaft are other arms, 75, carrying the main cut-off valve 76. The hubs of arms 73 are formed to engage (after the manner of clutches) with those of arms 75, as at 77, Fig. 2, whereby the forward movement of said valve 74 carries with it the main valve 76 to the position shown in Fig. 7, thereby permitting a full stream of grain to flow down into bucket G. In Fig. 8 the main valve is shown closed, leaving only a narrow opening, 78, through which the grain may slowly flow or "drip" into the bucket to complete the charge or load to be weighed. In Fig. 9 the supplemental valve has also closed, thus entirely cutting off the stream of grain. For thus operating said cut-off valves, I employ the same devices as described for that purpose in said patent to Hill. Upon both ends of shaft 72 are screwed toes 80, the upper ends of which form lifting-toes. These two toes may be formed of one piece or of two pieces, as preferred. Evidently these toes and valve 74 have the same angular movement, since all of these parts are secured on the same shaft, 72. The pawls 23 24 operate to open the cut-off valves on the upward movement of the front end of beam B. The points of said pawls pass clear above said toes 80, as shown in Fig. 3, after which the said valves gravitate downward until arrested by contact of the notch 80 of the holding-toes with the stops 29 30 on said beam. On receiving the major part of its load of grain the bucket descends until the supplemental weight 34 rests on the main beam B. Meanwhile the stops 29 30 have descended with the beam, passing off from notch 81, thereby letting the valves swing under hopper H until stopped by the second notch, 82, coming in contact with the said stops 29 30, at which time said cut-off valves stand as shown in Fig. 8. The grain now continues to flow, but much more slowly, into the bucket, until the final or supplemental load is received therein, when the bucket overbalances the additional weight 34 and descends, carrying stops 29 30 down below notches 82, and thus permitting valve 74 to close, as in Fig. 9. During said descent pawls 23 24 are drawn down over toes 80, as in Fig. 5, and stand ready to again open the cut-off valves on the ascent of the main beam. This is the mode of operation described substantially as in the aforesaid patent, No. 302,136, but with the aid of different reference-characters.

One part of my present invention relates to the construction of the lower end or spout of said hopper H and to the construction and the combination, with said hopper-spout, of the cut-off valves. On the rear side of said spout I cut away the wall thereof, as at 83, Figs. 7, 8, and 9, and provide a vertically-adjustable plate, 84, held in place by screws 89, by which the opening 85, above the closed valve 74, may be adjusted as required for adapting the machine to weigh different kinds of grain. It will be noticed that the said spout is cut away, as described, on the side opposite to that from which the cut-off valve 74 swings under the spout. A flexible apron, 86, is fastened by its upper edge to the inner side of the front wall of said spouts, so that when valve 76 stands forward said apron reaches down in front of said valve, as in Fig. 7, thereby preventing grain or foreign matter—as sticks, pieces of twine, or the like—from entering between the said valve and the lower edge of said front wall. This feature is also applied to spouts 39 41, operating in connection with valves 50 52.

Figure 7:
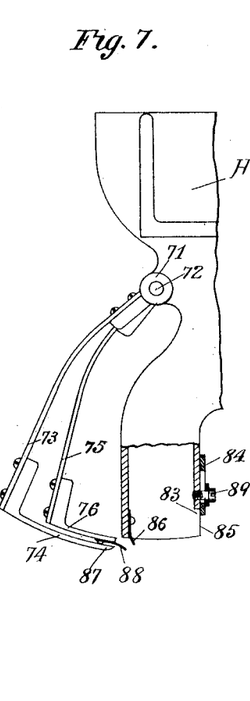
Figs. 7, 8, and 9 illustrate the construction and operation of certain improvements in the cut-off valves.
Figure 8:
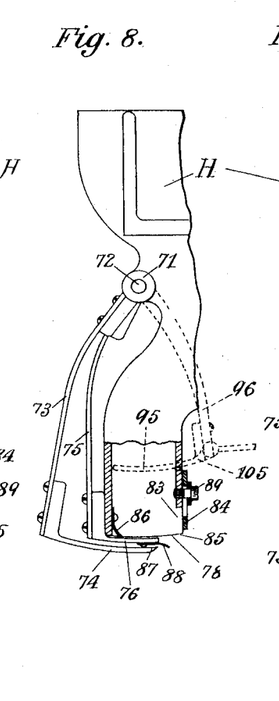
Figure 9:
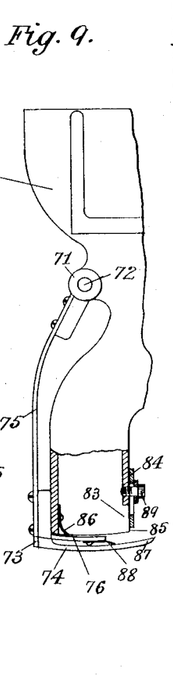
Figure 10:
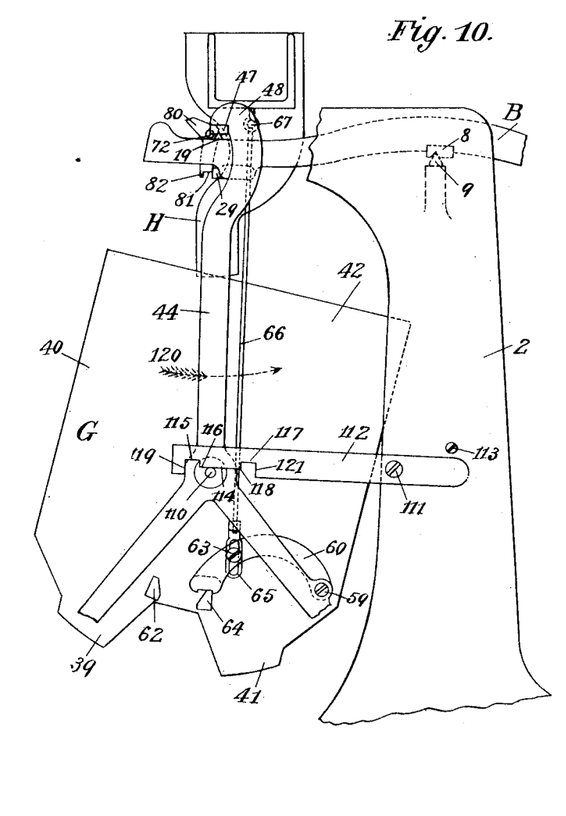
Figs. 10, 11, 12, 13, and 14 are a series of views illustrating the construction and operation of certain improvements in connection with the oscillating grain-bucket.
Figure 11:
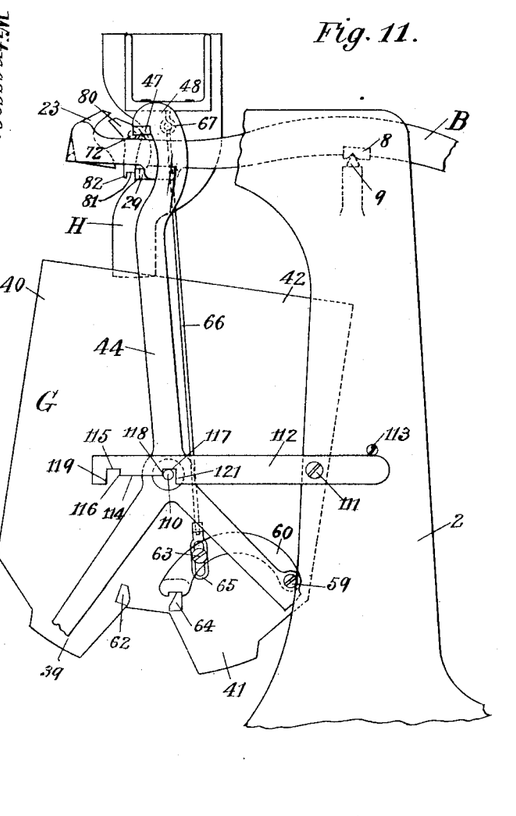

A second feature is the flexible apron 88, (of rubber packing, leather, or the like,) fastened to the under side of the main valve, (and preferably extending beyond the edge thereof,) and protecting the forward edge, 87, of the valve 74, as in Fig. 7, and serving to protect the space between said valves, as in Figs. 8 and 9. It is well known that in practice the grain delivered to grain-weighing machines often is not clean, but has therein much dirt, together with bits of cob, pieces of bagging and twine, straw, sticks, &c., so that, as heretofore made, this class of machines have suffered greatly from clogging of the valves one upon the other. The described improvements, however, have practically overcome that difficulty and enabled me to successfully operate the machines on ordinary poorly-cleaned grains of various kinds, as wheat, corn, oats, &c.

One of the uses of automatic grain-weighers is to weigh and deliver grain to grinding-mills, which must not be oversupplied. For such uses I provide my improved machine with an automatic regulator, substantially as follows: Underneath the bucket, and for receiving the grain discharged therefrom, I arrange a vertically-movable hopper, P, of any suitable form and material and having an opening, N, in the bottom thereof of less capacity than spouts 39 or 41. This hopper may be arranged to have a sliding vertical movement, as shown in another application to be filed; but I have herein shown a different arrangement thereof. By this latter plan the hopper is secured between the two arms 90 of the lever L, which lever is pivoted to the main frame at 91, and has on the rear end thereof a regulator-weight, 92, of sufficient weight to raise said hopper, together with a small quantity of grain therein. Below the hopper P a fixed chute, 93, substantially of the size of the opening in the bottom of said hopper, is arranged to convey away the grain, and said chute is joined to the hopper by a pipe or connection, 94, which I make of thin leather, canvas, or the like flexible material, as described and claimed in a separate application, Serial No. 288,159.

The regulator-valve 95 is in a general way similar to the cut-off valves, and is suspended by arms 96 from the bearings 71, or from some point adjacent thereto. Said valve 95 is arranged to swing under the spout H at the same height as and oppositely to the main cut-off valve, and to meet that valve, as shown in Figs. 5 and 6, under the chute or hopper H. The regulator-valve is operatively connected with lever L in such manner that the downward movement of hopper P throws said valve forward, and vice versa. Such connections may consist of the following: A rod, 97, is connected to lever L at 98, and at 99 to the angle-lever 100, which is pivoted at 101 to the cross-beam 5. Another rod, 102, connects said lever 100 with the said valve 95. The general operation of this regulator apparatus will be readily understood from the drawings and preceding description. When the grain passes freely through chute 93, the hopper P rises, and thereby draws back valve 95, as in Fig. 3; but when said chute 93 becomes choked the grain accumulates in hopper P, and by its weight carries down the same, as in Figs. 5 and 6, thereby moving forward valve 95 under spout H until meeting the main cut-off valve 76, as shown in said figures. This apparatus is not in the nature of a "stop-motion," but operates to retard or stop the operation of the machine, and afterward to start the same again as the grain passes out of the regulator-hopper.

It will thus be seen that my improved grain-weighing machine is not only "automatic," in the usual sense of that term, but is also automatic in the sense that it is self-regulating, having the capacity of being automatically stopped in its operation by its own regulator apparatus, and of automatically starting again when the load of grain in the regulator-hopper is sufficiently diminished. These functions, indispensable to a practically successful grain-weigher, are obtained by means of my present improvements, which are especially constructed and organized therefor. This organization is such (the hopper P being suitably counterbalanced to normally open valve 95) that the load of one chamber, 40, being discharged into the hopper P (the pipe 93 being full of grain) this hopper is carried down, and thereby closes valve 95 as soon as or before the major part of its load has been received by the opposite chamber, 42; and when this part of such load is received, thereby causing the valve 76 to be closed, the stream of grain is cut off and the operation of the machine is stopped, and this with the second cut-off valve, 74, still open. The machine now stands idle until the diminishing load in the hopper P allows the same to rise, thereby opening the regulator-valve, and thus permitting the "drip" to complete the load in chamber 42. By this mode of operation the machine stops whenever stopped by the regulator apparatus, with the main weight 16 lifted, but with the supplemental weight 34 not lifted. When the opening of valve 95 again starts the machine, the completion of the bucket-load first causes valve 74 to be shut, and immediately carries down the bucket to be shifted and discharged, and to then rise again and open the cut-off valves, as before. In the meantime, if the load last discharged shall have again carried down the hopper P, then the opening of the said valves 74 and 76 can only admit to the bucket the major part of another load, whereupon the machine will again stop, as before. It should be noted in this connection that the mechanism being organized as here set forth the machine cannot stop during the time in which the "drip" is completing the load, for there is no means that can operate to depress the hopper P, except the discharge of the load not then completed. For this reason my said improvements avoid a liability that would otherwise exist of the machine sometimes becoming incapable of automatically starting again after having been stopped by the regulator. This result might happen, in such a case as I have supposed, should the regulator-valve be closed at the instant before the closing of the second cut-off valve, thereby catching and holding back some of the kernels of falling grain that would otherwise be added to the load and make up that perfect weight which is required to carry down the bucket, and thus cause the machine to continue in operation.

It should be understood that if any obstruction should prevent valve 95 from fully meeting valve 76 the valve 74 will generally close under the intervening space, and thereby make perfect the operation of the regulator. It will thus be seen that there is a distinct utility in the combination comprising valves 95 and 76, and an additional utility in a combination comprising the three valves 95, 76, and 74, co-operating together, as here described.

Since the two chambers 40 and 42 are loaded alternately, and since the entire bucket with its appurtenances is suspended from knife-edges, it is obvious that the bucket will shift its position according to its varying load and swing toward one side or the other (forward or backward in the machine) according as the load is received or discharged from the one or the other of said chambers. These movements of the bucket, especially when this is loaded, sometimes acquire considerable force and extend through an arc of from ten to twenty or more degrees, the edges 19 21 being the axis of said movement. The result is, owing to the natural law by which such moving bodies tend to go in tangential lines, that the bucket, when approaching the extremes of its arc of swaying movement, exerts a very appreciable downward thrust on the scale-beam, which thrust is due not to the weight of the bucket and its load, but to the momentum of that weight. If, now, the said outward movement of the bucket takes place (as it sometimes does) at the moment just prior to the normal closing of cut-off valve 74, the force of said downward thrust is in effect added to the weight of the load, thereby prematurely closing said cut-off valve and discharging the load deficient in weight by the amount of such thrust. To overcome, or, rather, to reduce this error, it has been necessary heretofore to operate the machines at a slow speed, and especially to allow the drip to make a considerable percentage (about one-fifth to one-fourth) of the load. To properly control said swaying of the bucket and hangers, (which evidently must not be prevented altogether,) and thereby practically eliminate the liability to said error, is the object of the devices which I will next describe.

In place of the stud 58 and the link 57, Figs. 2, 3, and 5, I provide some suitable stud, as 110, and the stop-latch 112, Figs. 10 to 14, inclusive. Said latch 112 lies about horizontally, is pivoted to the main frame at 111, and rests against some suitable stop, as 113. The working end of this latch (at the left hand in said Figs. 10 to 14) is shaped to have a central bearing, 114, two oppositely-disposed catches, 116 and 118, two notches, 115 and 117, large enough to receive said stud 110, and two oppositely-disposed stop-faces, 119 121, extending below said bearing 114. These parts are to be proportioned in any particular case conformably to the size and proportions of the machine and to operate as herein described. On the discharge of the load from chamber 42 the bucket first swings toward the left hand (not shown) and then rises and swings toward the right hand, as shown by arrow 120 in Fig. 10, the stud 110 striking first against bearing 114 and then against stop-face 121, after which the latch drops, with said stud in notch 117 and bearing against catch 118, as in Fig. 11. Chamber 40 now receives the major part of its load, which carries down the bucket (as hereinbefore described in connection with the valve-actuating devices) until stud 110 passes below catch 118, (and swings slightly to the left hand,) as in Fig. 12. The final load being now completed by the drip, the bucket meanwhile goes down, as in Fig. 13, and swings very slightly toward the right hand. At this point the bucket-latch 60 is raised, as before described, allowing the bucket to oscillate on its journals and chamber 40 to discharge its load. This causes the bucket to swing first backward (not shown) and then forward, the stud 110 first striking bearing 114 next the stop-face 119, and finally resting in notch 115 against catch 116, as in Fig. 14. Chamber 42 now receives its load and the several operations go on as before. It may be noted here that the first swinging movement (above referred to, but not shown) of the bucket is due partly to the momentum of the bucket and partly to the action and pressure of the discharging load of grain on the inclined sides of the bucket-spouts, all in accordance with a well-known principle; and it will now be understood how, by means of devices substantially as herein described, the movement of the bucket due to the discharge of one load results in carrying the bucket over to and locking it in the normal position due to the major part of the other load. This feature effectively obviates the vertical thrust on the scale-beam due to the momentum of the swaying load, and while thereby securing greater precision of weighing permits a marked increase (in my practice about fifty per centum) in the speed and consequent capacity of the machine.

The several features of my invention and the operation thereof having now been described, the operation of the whole machine will be understood without a further description, especially since such operation of the older parts thereof is fully described in the aforesaid patent to Hill and in the patents therein by him referred to.

My improvements are capable of modification in various ways and degrees, after the manner of machines in general, within the scope and limits of my invention.

Having thus described my invention, I claim—

1. The combination, with the scale-beam and with the laterally elastic hangers suspended therefrom, substantially as described, and having bearings for the bucket, and below said bearings carrying the bucket-closing valves, of the oscillating bucket journaled in said bearings and limited in its oscillating movement by abutments on said valves, all substantially as described.

2. The combination, with the hangers 44 46, of the bucket journaled therein and having spouts 39 41, valves 50 52, fixed to said hangers and arranged to close said spouts alternately, and the abutments 51 53 on the outer edges of said valves, respectively, substantially as described.

3. The combination and arrangement, with the grain-discharging hopper H, having its spout cut away on one side thereof at 83, of the vertically-adjustable plate 84 and the cut-off valve constructed and arranged to pass horizontally under said spout and plate from the side opposite of said plate 84, all substantially as described, and for the purpose specified.

4. The combination, with the hopper-spout, of the main valve 76, the supplemental valve 74, and the flexible apron 88, affixed to valve 76 and protecting the edge of valve 74, all substantially as described.

5. The combination, in a grain-weighing machine, of a grain-bucket, a chute for conveying grain thereto, a swinging cut-off valve arranged to swing under said chute to partially cut off the flow of grain to the bucket, a scale-beam carrying the bucket and operatively connected to open said cut-off valve on the rising of said beam, a swinging regulator-valve arranged to swing under said chute oppositely to said cut-off valve and to partially cut off the flow of grain to said bucket, and a vertically-movable regulator-hopper below said bucket and receiving the grain therefrom, said regulator-hopper being operatively connected to actuate said regulator-valve, whereby the two valves, acting together, operate to entirely cut off the flow of grain to the bucket, all substantially as described.

6. The combination, in an automatic grain-weigher, of the scale-beam, a grain-bucket suspended therefrom, a main weight suspended from said beam, the supplemental weight, the grain-chute above said bucket, the two cut-off valves constructed and arranged to swing one under the other and both under said chute, said valves being operatively connected to be opened from and on the rising of said beam, the regulator-valve constructed and arranged to swing under said chute oppositely to the first cut-off valve, and a vertically-movable regulator-hopper under said bucket and counterbalanced to normally open said regulator-valve, said hopper being operatively connected to close said regulator-valve on the downward movement of the hopper, and the whole being organized and coacting, as set forth, to close said regulator-valve before the supplemental weight is lifted and with the second cut-off valve standing open, all substantially as described.

7. The combination, with the spout of hopper H, of the oscillating cut-off valve 76 and the regulator-valve 95, both valves being suspended, substantially as described, and arranged to meet below said spout, the two valves being operated independently, all substantially as described.

8. The combination, with the spout of hopper H, of the cut-off valve 76 and the regulator-valve 95, both arranged to be moved toward each other under said spout, and the valve 74, arranged to be moved under both of the said valves 76 and 95, substantially as described.

9. The combination, with the vertically-movable double-chambered oscillating grain-bucket suspended, substantially as described, by hangers from knife-edges and provided with a stud or catch, 110, the whole being arranged to swing on its supporting knife-edges, of the stop-latch pivoted to the frame of the machine and having the notches 115 and 117, whereby the swaying movement of the bucket and hangers due to the discharge of one load carries the same over to and locks them substantially in the normal position due to the major part of the other load, substantially as described.

CHARLES H. COOLEY.

Witnesses:
FRANCIS H. RICHARDS,
GEO. W. DRAKE.